Dec. 24, 1963  J. W. SARVIS ETAL  3,115,061
DISINTEGRATING AND RELINKING AMMUNITION BELT LINK
Filed July 6, 1962
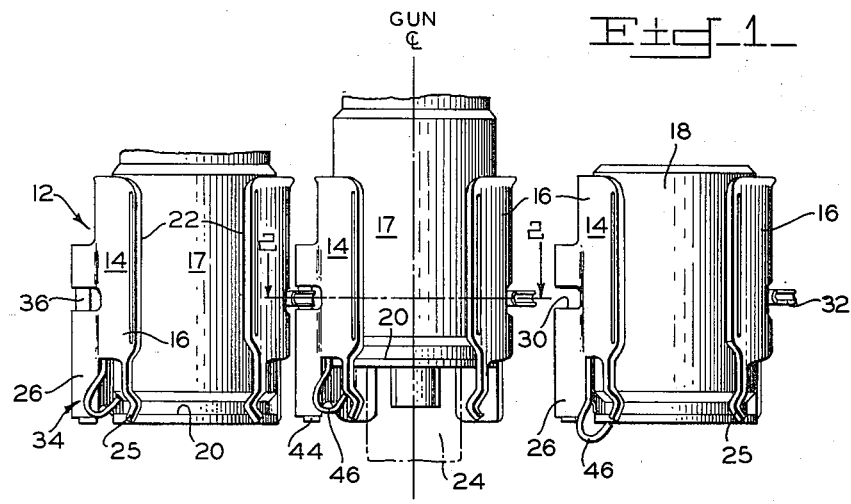
*Fig. 1*
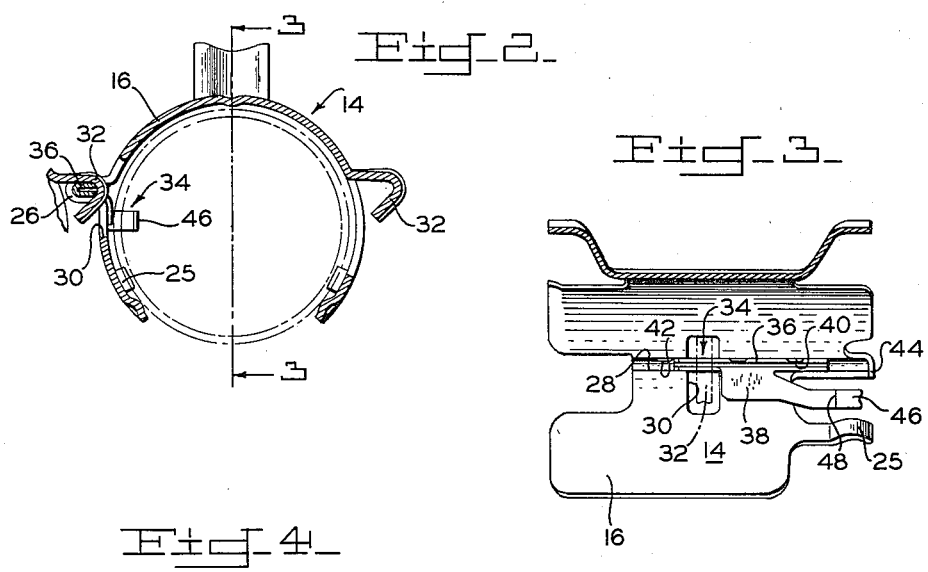
*Fig. 2*
*Fig. 3*
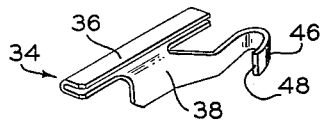
*Fig. 4*
INVENTORS
John William Sarvis
Joseph R. Muyer
BY
S. J. Rotondi & A. T. Dupont ered Dec. 24, 1963

3,115,061
DISINTEGRATING AND RELINKING
AMMUNITION BELT LINK
John William Sarvis and Joseph R. Mayer, Springfield, Mass., assignors to the United States of America as represented by the Secretary of the Army
Filed July 6, 1962, Ser. No. 208,147
4 Claims. (Cl. 89—35)
(Granted under Title 35, U.S. Code (1952), sec. 266)

The invention described herein may be manufactured and used by or for the Government for governmental purposes without the payment to us of any royalty thereon.

This invention relates to cartridge belt links and more particularly to such links which are of disinegrating types.

It is the object of this invention to provide a cartridge belt link which is disconnectable from the next succeeding link by the relinking of the expended cartridge case therein after being stripped therefrom.

The specific nature of the invention as well as other objects and advantages thereof will clearly appear from a description of a preferred embodiment as shown in the accompanying drawings in which:

FIG. 1 is a bottom view of a cartridge belt in which the round in the left-hand one of the links is fully indexed therein, the round in the center one of the links is partially stripped therefrom, and the bolt of the right-hand one of the links is displaced to the unlatched position by the relinked expended case to disconnect such link from the cartridge belt;

FIG. 2 is a view taken along line 2—2 of FIG. 1;

FIG. 3 is a view taken along line 3—3 of FIG. 2; and

FIG. 4 is a perspective view of the bolt.

Shown in the figures is a cartridge belt 12 composed of a plurality of links 14 which are articulately connected together. Each of the links 14 includes a clamping member 16 which is cylindrically formed to snugly grip a round 17 having a case 18 with an extractor groove 20. Clamping member 16 is interrupted by a longitudinal opening 22 which provides a clearance for passage of a breech member 24 through the clamping member to strip round 17 forwardly therefrom and to relink expended case 18 rearwardly therein by cyclic reciprocation of the bolt.

Clamping member 16 is provided with a pair of tabs 25 which extend rearwardly therefrom and which are designed to be resiliently pressed into extractor groove 20 of case 18 to hold the case in the clamping member. Formed along the length of clamping member 16 on one side of opening 22 is an outwardly projecting fold 26 which forms a channel 28. Fold 26 is interrupted by a gap 30. Extending outwardly from clamping member 16 on the opposite side of opening 22 is a catch 32 of U-configuration.

Catch 32 and gap 30 are arranged so that the catch on one of the links 14 is receivable by the gap on the next adjoining link and the catch is releasably held in the gap to hold the two links together by means of a bolt 34. Bolt 34 includes a slide-bar 36, which is slidingly received by the section of channel 28 which is rearwardly of gap 30, and an actuator arm 38 which extends integrally from the inside of the slide-bar and is offset to one side thereof. Slide-bar 36 is slidingly retained in channel 28 by means of nubs 40 pressed thereinto from one side of fold 26. The forward displacement of bolt 34 is limited by an interference 42 pressed into the section of channel 28 which is forwardly of gap 30. The rearward displacement of bolt 34 is limited by a lip 44 which is folded over the rear end of channel 28 after slide-bar 36 is installed therein.

Actuator arm 38 is terminated at the rear end by a crook 46 the free end of which, noted at 48, is positioned inwardly relative to clamping member 16, and is arranged to extend forwardly so as to be contactable by the base of case 18 while being relinked in the clamping member. When round 17 is originally slid forwardly into clamping member 16 to be linked therein, the contact of the round with the curved portion of crook 44 springs the crook outwardly to permit the sliding displacement of the round relative thereto. When round 17 is fully indexed in link 14, tabs 25 are located in extractor groove 20 and crook 46 is also resiliently engaged therewith. With crook 46 engaged with extractor groove 20, bolt 34 is positioned in the forward latching position with the front end of slide-bar 36 bridging gap 30 through catch 32.

When round 17 is stripped from link 14, crook 46 springs inwardly to the normal position thereof wherein end 48 is positioned to be engaged by the base of expended case 18 while being relinked, whereby bolt 34 is displaced by the relinking to the rearward unlatched position wherein the front end of slide-bar 36 is withdrawn from catch 32 to disconnect link 14 with expended case 18 therein from cartridge belt 14.

Although a particular embodiment of the invention has been described in detail herein, it is evident that many variations may be devised within the spirit and scope thereof and the following claims are intended to include such variations.

We claim:

1. A cartridge belt link for holding a round having a case with an extractor groove so that the round is axially stripped from said link and the expended case is relinkable thereinto, the link including a round clamping member, a bolt disposed in cooperation with said clamping member for releasably connecting the link to an adjoining link to form a belt, and a resilient section on said bolt arranged to snap into a position for contact by the case during relinking to actuate said bolt to the unlatched position.

2. A cartridge belt link for holding a round having a case with an extractor groove so that the round is axially stripped from said link and the expended case is relinkable thereinto, the link including a round clamping member, a longitudinal opening in said clamping member to provide clearance for passage of a breech member therealong to effect the stripping of the round and the relinking of the case, a longitudinal fold formed on one side of said opening, a gap in said fold, a catch of U-configuration formed on the other side of said opening so as to be receivable by said gap in an adjacent link, a bolt slidably mounted in said fold for displacement between a latching position having engagement with said catch in the adjacent link to form a belt and an unlatched position disengaged from said catch, and a resilient section on said bolt arranged to snap into a position for contact by the case during relinking to actuate said bolt to the unlatched position.

3. The link as defined in claim 2 wherein said resilient section includes an arm terminated by a crook formed at one end thereof so as to be sprung outwardly by said round when indexed in said clamping member, and when the round is stripped from said clamping member to assume a position for contact by the case when relinked in said clamping member so that said bolt is displaced by the relinked case to the unlatched position.

4. The link as defined in claim 3 wherein said crook is related respective to said arm so as to be resiliently positioned in the extractor groove of the round in said clamping member when said bolt is in the latching position to retain said bolt therein.

References Cited in the file of this patent

UNITED STATES PATENTS

| | | |
|---|---|---|
| 2,345,340 | Howe | Mar. 28, 1944 |
| 2,866,388 | Reynolds et al. | Dec. 30, 1958 |

FOREIGN PATENTS

| | | |
|---|---|---|
| 831,162 | France | May 30, 1938 |